(12) United States Patent  
Ubbenhorst et al.

(10) Patent No.: US 11,987,993 B2
(45) Date of Patent: May 21, 2024

(54) FLOOR COVERING COMPRISING UV-DETECTABLE PRIMER

(71) Applicant: SIKA TECHNOLOGY AG, Baar (CH)

(72) Inventors: Vera Ubbenhorst, Gescher (DE); Tobias Benighaus, Münster (DE); Rosalin Wevering, Münster (DE)

(73) Assignee: SIKA TECHNOLOGY AG, Baar (CH)

( * ) Notice: Subject to any disclaimer, the term of this patent is extended or adjusted under 35 U.S.C. 154(b) by 137 days.

(21) Appl. No.: 17/495,309

(22) Filed: Oct. 6, 2021

(65) Prior Publication Data

US 2022/0106797 A1   Apr. 7, 2022

(30) Foreign Application Priority Data

Oct. 6, 2020   (EP) .................................... 20200419

(51) Int. Cl.
*E04F 15/10* (2006.01)
*B32B 27/08* (2006.01)
*B32B 27/30* (2006.01)

(52) U.S. Cl.
CPC ............ *E04F 15/107* (2013.01); *B32B 27/08* (2013.01); *B32B 27/308* (2013.01);
(Continued)

(58) Field of Classification Search
CPC ........ B32B 27/308; C08F 20/02; C08F 20/04; C08F 20/0608; C08F 20/10; C08F 20/12; C08F 20/14; C08F 20/16; C08F 20/18; C08F 20/20; C08F 120/02; C08F 120/04; C08F 120/0608; C08F 120/10; C08F 120/12; C08F 120/14; C08F 120/16; C08F 120/18; C08F 120/20; C08F 220/02; C08F 220/04; C08F 220/0608; C08F 220/10; C08F 220/12; C08F 220/14; C08F 220/16; C08F 220/18; C08F 220/20; C08L 33/00; C08L 33/02; C08L 33/04; C08L 33/06;
(Continued)

(56) References Cited

U.S. PATENT DOCUMENTS

| 2003/0081203 | A1* | 5/2003 | Chen ................. G01N 21/8422 356/300 |
| 2008/0206583 | A1* | 8/2008 | Phan ...................... C08L 23/10 264/211.21 |
| 2017/0058143 | A1* | 3/2017 | Bitler .................... E04F 15/107 |

FOREIGN PATENT DOCUMENTS

| DE | 102004058584 A1 | 6/2006 |
| GB | 2462668 A * | 2/2010 ............... C09D 5/22 |

(Continued)

*Primary Examiner* — Zachary M Davis
(74) *Attorney, Agent, or Firm* — Oliff PLC

(57) ABSTRACT

A floor structure on a base 1 comprising a primer 2 and a floor covering 3 which is atop the primer and comprises a floor coating and/or an adhesive bond, wherein the primer 2 is obtained from an aqueous dispersion of at least one acrylic polymer containing 0.001-0.2% by weight of at least one benzoxazole-based system, based on the total weight of the aqueous dispersion. Such systems in aqueous dispersions containing at least one acrylic polymer do not impair storage stability and also permit good detectability of the coating on the base, both shortly after application of the coating and 6 months thereafter. More particularly, no reduction in detectability over time is found.

14 Claims, 1 Drawing Sheet

(52) U.S. Cl.
CPC ....... *B32B 2255/26* (2013.01); *B32B 2419/04* (2013.01); *B32B 2471/00* (2013.01)

(58) Field of Classification Search
CPC .... C08L 33/062; C08L 33/066; C08L 33/068; C08L 33/08; C08L 33/10; C08L 33/12; C09D 133/00; C09D 133/02; C09D 133/04; C09D 133/06; C09D 133/062; C09D 133/064; C09D 133/066; C09D 133/068; C09D 133/08; C09D 133/10; C09D 133/12; E04F 15/105; E04F 15/107
See application file for complete search history.

(56) References Cited

FOREIGN PATENT DOCUMENTS

| | | |
|---|---|---|
| WO | 03/038408 A2 | 5/2003 |
| WO | 2010/108762 A1 | 9/2010 |
| WO | 2019/037805 A1 | 2/2019 |

\* cited by examiner

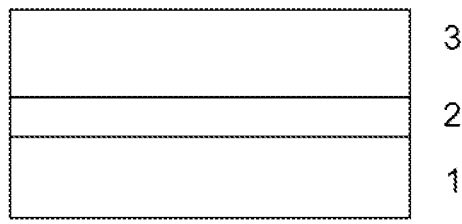

FLOOR COVERING COMPRISING UV-DETECTABLE PRIMER

TECHNICAL FIELD

The invention relates to floor coverings comprising floor coatings such as synthetic resin floors or adhesive bonds such as bonded parquet, containing a UV-detectable primer.

STATE OF THE ART

There is a multitude of different constructions that are used as floor coverings. For example, two-dimensional materials such as parquet are used for this purpose, and are fixed with an adhesive bond. Recently there has been increasing use of synthetic resin floors as floor coverings.

Bases that are to be provided with a floor coating or adhesive bond are frequently provided with a primer by way of preparation. The primer serves, for example, to provide a smooth surface and/or to improve the adhesion of the layers to be applied subsequently and/or to reduce the exchange of moisture between base and floor covering.

In the case of film-forming primers, it is possible to some degree to detect by eye that this primer has been applied. However, this is only the case for film-forming primers. It is not possible to visually identify primers that penetrate into the base, also called deep primers. For further analysis, samples have to be taken from the construction site and analyzed in the laboratory. It is possible there to identify the type and amount of the polymer via techniques such as IR spectroscopy, HS GC/MS spectroscopy or thermogravimetric analysis. Alternative options for product identification are the addition of specific substances that can be identified later, for example specific nontoxic heavy metals that are not normally part of the product or the application environment.

There is a great interest in solutions according to the prior art for the problem of easily and rapidly detecting deep primers and film-forming primers that are difficult to see by eye, for example in the event of damage or for quality control. In the case of addition of specific substances, it is critical that this does not impair the quality and properties of the primers, especially storage stability. Moreover, detection should also still be readily possible over a long period of time after the application of the primer, especially after half a year or more.

WO 03/038408 A2 discloses a method of detecting wear of floor coverings. In this case, the uppermost layer or the layer directly beneath contains a fluorescent compound. Wear is detected via the detection of the presence or absence of fluorescence.

SUMMARY OF THE INVENTION

It was therefore an object of the present invention to provide floor structures with floor coverings comprising floor coatings or adhesive bonds with a primer, in which the primer can be detected easily, rapidly and over a long period of time. Moreover, the quality and properties of the primers, especially storage stability, are not to be impaired thereby.

The object was surprisingly achieved by using a primer obtained from an aqueous dispersion of at least one acrylic polymer containing 0.001-0.2% by weight of at least one benzoxazole-based system, based on the total weight of the aqueous dispersion.

The invention therefore relates to a floor structure on a base 1 comprising a primer 2 and a floor covering 3 which is atop the primer and comprises a floor coating and/or an adhesive bond, characterized in that the primer 2 is obtained from an aqueous dispersion of at least one acrylic polymer containing 0.001-0.2% by weight, 0.005-0.1% by weight, especially 0.002-0.05% by weight, 0.005-0.03% by weight, more preferably 0.01-0.02% by weight, of at least one benzoxazole-based system, based on the total weight of the aqueous dispersion.

It has been found that, surprisingly, such systems in aqueous dispersions containing at least one acrylic polymer do not notably increase the viscosity even after a storage time of 4 weeks and hence do not impair storage stability. Moreover, these systems permit good detectability of the coating on the base, both shortly after application of the coating and 6 months thereafter. More particularly, no reduction in detectability over time is found.

The invention further relates to a method of producing the floor structure of the invention. Preferred embodiments of the invention are given in the independent claims.

BRIEF DESCRIPTION OF THE DRAWING

FIG. 1 gives a schematic reproduction of a floor structure according to the invention.

MODE OF EXECUTION OF THE INVENTION

The floor structure of the invention comprises, on a base 1, a primer 2 and a floor covering 3 which is atop the primer and comprises a floor coating and/or an adhesive bond, wherein the primer is obtained from an aqueous dispersion of at least one acrylic polymer containing 0.001-0.2% by weight, 0.005-0.1% by weight, especially 0.002-0.05% by weight, 0.005-0.03% by weight, more preferably 0.01-0.02% by weight, of at least one benzoxazole-based system, based on the total weight of the aqueous dispersion.

Suitable bases for the floor structure are in principle all bases or substrates on which floor coverings are typically applied, for example those used in built structures for floor construction. Preference is given to bases based on mineral binders.

The term "mineral binder" in the present document refers to binders that react in the presence of water in a hydration reaction to form solid hydrates or hydrate phases. More particularly, the term "mineral binder" in the present document relates to nonhydrated mineral binders, i.e. mineral binders that have not been converted in a hydration reaction and/or cannot enter into a hydration reaction in the presence of water. Suitable mineral binders include hydraulic, non-hydraulic, latently hydraulic and pozzolanic binders.

The term "hydraulic binder" in the present document refers to substances that cure owing to a chemical reaction with water ("hydration reactions") and produce hydrates that are not water-soluble. In particular, the hydration reactions of the hydraulic binder take place essentially irrespective of the water content. This means that hydraulic binders can cure and retain their strength even if they are exposed to water, for example under water or under conditions of high air humidity. Examples of hydraulic binders are cement, cement clinker and hydraulic lime. By contrast, "nonhydraulic binders" such as air-slaked lime (nonhydraulic lime) and gypsum are at least partly water-soluble and must be kept dry in order to retain their strength.

The term "gypsum" in the present document refers to any known form of gypsum, especially calcium sulfate dehydrate, calcium sulfate α-hemihydrate, calcium sulfate β-hemihydrate or calcium sulfate anhydrite or mixtures thereof.

The term "latently hydraulic binder" in this document refers to particular type II concrete additives with latently hydraulic character according to DIN EN 206-1: 2000. These materials are calcium aluminosilicates which, when mixed, cannot cure directly or too slowly water. The curing process is accelerated in the presence of alkaline activators that break the chemical bonds in the amorphous (or vitreous) phase of the binder and promote the dissolution of ionic species and the formation of calcium aluminosilicate hydrate phases. Examples of latently hydraulic binders include pelletized blast furnace slags.

The term "pozzolanic binder" in this document refers especially to type II concrete additives with pozzolanic character according to DIN EN 206-1: 2000. These materials are silicon-containing or aluminosilicate compounds that react with water and calcium hydroxide to form calcium silicate hydrate, or calcium aluminosilicate hydrate phases. Pozzolan binders include natural pozzolans such as trass, and synthetic pozzolans such as fly ash and silica dust.

Particular preference is given to bases based on hydraulically setting mineral binders, especially cement or gypsum. Very particularly suitable bases are concrete and screed. Preference is given to porous bases.

The primer 2 is obtained from an aqueous dispersion of at least one acrylic polymer containing 0.001-0.2% by weight, 0.005-0.1% by weight, especially 0.002-0.05% by weight, 0.005-0.03% by weight, more preferably 0.01-0.02% by weight, of at least one benzoxazole-based system, based on the total weight of the aqueous dispersion.

The term "acrylic polymer" in the present document relates to homopolymers, copolymers and higher interpolymers of an acrylic monomer with one or more further acrylic monomers and/or with one or more other ethylenically unsaturated monomers. The term "acrylic monomer" in the present document relates to (meth)acrylates, (meth)acrylic acid and derivatives thereof, for example amides of (meth) acrylic acid or nitriles of (meth)acrylic acid.

Preferred acrylic polymers contain at least 30% by weight, more preferably at least 40% by weight, most preferably at least 50% by weight, of acrylic monomers. The term "aqueous composition" in the present document relates to a composition in which water is the primary dissolution medium or solvent. Preferably, the "aqueous composition" relates to a composition in which water is the sole dissolution medium or solvent.

Particularly suitable acrylic polymers for the aqueous dispersion consist mainly of (meth)acrylates of alcohols having 1 to 24 carbon atoms. Preferred acrylic polymers contain, as polymerized units, at least 25% by weight, more preferably at least 50% by weight, most preferably at least 75% by weight, of these acrylic monomers.

Preferred ethylenically unsaturated monomers and derivatives thereof that can be used as comonomers with the acrylic monomers are selected from the list consisting of vinyl esters and allyl esters of carboxylic acids having 1 to 20 carbon atoms; vinyl ethers of alcohols having 1 to 8 carbon atoms; vinylaromatics, especially styrene; nonaromatic hydrocarbons having 2 to 8 carbon atoms and at least one olefinic double bond, and α- and β-unsaturated mono- or dicarboxylic acids having 3 to 6 carbon atoms, especially vinylaromatics, more preferably styrene.

The at least one acrylic polymer is preferably a copolymer of an acrylic monomer with one or more other ethylenically unsaturated monomers, especially a copolymer of an acrylic monomer with vinylaromatics, especially styrene, more preferably a styrene-acrylic ester copolymer.

The at least one acrylic polymer preferably has a glass transition temperature (Tg) in the range from −40 to 20° C., more preferably 0 to 20° C. Suitable aqueous dispersions of acrylic polymers are commercially available, for example, from BASF, such as Arconal® 5041, Arconal® S 410, Arconal® S 559, Arconal® S 813, Arconal® S 790, Arconal® S 533, Arconal® A 508, Arconal® ECO 6258; from Wacker Chemie AG, such as Vinnapas® 202 HD, Vinnapas® 240 HD, Vinnapas® 538 ED, Vinnapas® 550 ED; from Celanese, such as Mowilith® DM 1340; from Dow, such as Primal® CA 162 and Primal® CA 172.

The aqueous polymer dispersion preferably has a solids content of 10-60% by weight, 25-55% by weight, preferably 35-55% by weight, based on the total weight of the aqueous polymer dispersion.

The aqueous polymer dispersion preferably has a particle size of 10-300 nm, especially 20-150 nm. Particle size is preferably determined by laser diffractometry.

The aqueous polymer dispersion may comprise two or more different acrylic polymers having different glass transition temperatures and different monomer compositions. Aqueous polymer dispersions comprising two or more different acrylic polymers can be produced by mixing commercially available acrylic polymer dispersions such as those described above.

The aqueous polymer dispersion may also further comprise additives selected from the list consisting of surfactants, defoamers, wetting agents, preservatives and thickeners.

The proportion of additives is preferably 0.05-5% by weight, 0.1-3% by weight, 0.1-2% by weight, preferably 0.15-1% by weight, preferably 0.15-0.3% by weight, based on the total weight of the aqueous polymer dispersion.

The aqueous polymer dispersion preferably consists to an extent of more than 80% by weight, to an extent of more than 90% by weight, to an extent of more than 95% by weight, to an extent of more than 98% by weight, to an extent of more than 99% by weight, to an extent of more than 99.5% by weight, based on the total weight of the aqueous polymer dispersion, of the aforementioned additives, acrylic polymers, benzoxazole-based system and water.

The aqueous dispersion containing at least one acrylic polymer contains 0.001-0.2% by weight of at least one benzoxazole-based system, based on the total weight of the aqueous dispersion. The proportion in the benzoxazole-based system, based on the total weight of the aqueous dispersion, is preferably 0.005-0.1% by weight, especially 0.002-0.05% by weight, 0.005-0.03% by weight, more preferably 0.01-0.02% by weight.

Proportions of more than 0.2% by weight are disadvantageous in that they are no longer of commercial interest on account of the high cost.

Benzoxazole-based systems are especially selected from the list consisting of 4,4'-(E)-bis(benzoxazolyl)stilbene, derivatives of 4,4'-(E)-bis(benzoxazolyl)stilbene, 2,5-bis(benzoxazol-2-yl)thiophene and derivatives of 2,5-bis(benzoxazol-2-yl)thiophene, preferably selected from the list consisting of 2,5-bis(benzoxazol-2-yl)thiophene and derivatives of 2,5-bis(benzoxazol-2-yl)thiophene.

Most preferred is 2,5-bis(benzoxazol-2-yl)thiophene.

It has been found that, surprisingly, these systems in aqueous dispersions containing at least one acrylic polymer do not notably increase the viscosity even after a storage time of 4 weeks and hence do not impair storage stability. Moreover, these systems permit good detectability of the coating on the base, both shortly after application and 6 months thereafter. More particularly, no reduction in detectability over time is found. This is apparent, for example, in tables 1 and 2.

It has further been found that, surprisingly, other systems do not show these advantages. For instance, the use of a styrylenebenzene derivative (Ref. 2 in table 1 and Ref. 6 in table 2) in such aqueous dispersions leads to a significant increase in viscosity and to inadequate detectability. The use of a stilbenedisulfonic acid derivative (Ref. 3 in table 1 and Ref. 7 in table 2) in such aqueous dispersions likewise leads to a significant increase in viscosity and hence to a reduction in storage stability, and does not allow adequate detectability. Finally, the use of a benzoxazinone derivative (Ref. 4 in table 1 and Ref. 8 in table 2) leads to inadequate detectability that additionally decreases significantly over time.

If the aqueous polymer dispersion should contain additional optical brighteners, it is preferable that the proportion of these additional optical brighteners is less than 30% by weight, less than 20% by weight, less than 10% by weight, less than 5% by weight, less than 1% by weight, less than 0.1% by weight, based on the total weight of the benzoxazole-based system present in the aqueous dispersion. More particularly, the aqueous polymer dispersion is free of additional optical brighteners mentioned. The additional optical brighteners mentioned does not mean the aforementioned benzoxazole-based systems.

The term "optical brighteners" as used here relates to optical brighteners (OBAs), fluorescent brighteners (FBAs) or fluorescent plasticizers (FWAs). These are typically dyes that absorb light in the UV and violet region (normally 200 to 400 nm) of the electromagnetic spectrum and release light again in the visible region (typically 400 to 700 nm).

Energy sources for ultraviolet (UV) radiation are typically used for the detection of the benzoxazole-based systems, preferably handheld UV lamps.

It may be advantageous when the primer 2 is what is called a deep primer which, on account of its viscosity and particle size, is able to penetrate into a porous base. Since such systems typically leave a transparent film discernible only with difficulty by eye, if any, on the base, detection of the benzoxazole-based system is particularly helpful in such cases.

The aqueous dispersion on which such a deep primer is based preferably has a viscosity one day after production of <3000 mPas, <1500 mPas, <1000 mPas, especially <800 mPas, measured with a Brookfield DV1 viscometer with spindle 4 at 20 rpm at 23° C.

The aqueous dispersion on which such a deep primer is based preferably has a particle size of 10-70 nm, especially 20-50 nm.

Such a deep primer is preferably disposed within the base 1 to an extent of more than 50%, more than 70%, more than 90%, more than 95%, more than 99%, based on the total thickness of the deep primer, especially when the base is absorptive. Such a deep primer preferably has a penetration depth into the base of 1-10 mm, especially 2-5 mm.

It may further be advantageous when the primer 2 is what is called a film-forming primer which, on account of its viscosity and particle size, is barely able to penetrate into a porous base, if at all. Such systems typically form a transparent film visible by eye on the base, but can be difficult to see on account of their thickness and/or color, especially in cases where they have to be detected subsequently in a finished floor structure. A benzoxazole-based system is helpful for these cases.

The aqueous dispersion on which such a film-forming primer is based preferably has a viscosity one day after production of >3000 mPas, >5000 mPas, >8000 mPas, especially 8000-20 000 mPas, measured with a Brookfield DV1 viscometer with spindle 4 at 20 rpm at 23° C.

The aqueous dispersion on which such a film-forming primer is based preferably has a particle size of 80-150 nm, especially 90-120 nm.

Such a film-forming primer preferably has a dry layer thickness of 0.05-0.5 mm, especially 0.1-0.2 mm.

The primer 2 is preferably obtained from the aforementioned aqueous dispersion on porous bases and/or bases with a rough surface.

The aqueous dispersion can be applied to the base by the conventional application methods. Conventional application methods are preferably application methods with cylinders, rollers, brooms or brushes.

According to the invention, there is a floor covering comprising a floor coating and/or an adhesive bond atop the primer 2. The adhesive bond may be an adhesive layer over the full area or part of the area. The floor coating or adhesive layer comprises at least one floor coating or adhesive layer, but may also comprise two or more of these layers. The floor covering may also comprise one or more layers of a two-dimensional material.

The floor coating or adhesive bond/adhesive layer comprises or is preferably at least one layer, especially a synthetic resin layer or an adhesive layer applied over the full area or part of the area, formed by application and curing of a liquid or pasty material. This layer is preferably disposed directly atop the primer.

Liquid or pasty materials used for the formation of the layer, especially the synthetic resin layer or adhesive layer, may, for example, be reactive resins or adhesives. The use of reactive resins for production of synthetic resin floors is preferred.

Synthetic resin layers, which are also referred to as reactive resin layers, are formed from a reactive resin that may optionally contain additives. For formation of synthetic resin layers, reactive resins are reacted, usually with the aid of a curing agent that may also contain accelerator. The reaction leads to curing of the reactive resin.

Such reactive resin coating compositions are commercially available in a wide variety. These are frequently two-component systems in which one component comprises the reactive resin, and the other component the curing agent or accelerator. In addition, systems having 3 or more components are also used. One-component systems are also possible. In the case of multicomponent systems, the components are mixed and then processed before use.

Examples of suitable conventional reactive resins for formation of the synthetic resin layer are selected from the list consisting of epoxy resins, polyurethanes, polyureas, polyacrylates, polymethacrylates and mixtures of polyurethanes and polyureas, resins based on silane-terminated prepolymers (STPs), synthetic resins based on polymer-modified mineral binders. Preference is given to synthetic resins based on polymer-modified mineral binders, especially polymer-modified hydraulically setting binders, preferably polymer-modified cements or gypsum. The mineral binder has preferably been modified with 0.1-5% by weight of polymers, especially 0.2-3% by weight of polymers, more preferably 0.5-2% by weight of polymers, based on the total weight of the modified mineral binder.

The reactive resin coating composition or the synthetic resin layer may, if required, contain one or more additives. Addition of additives can, for example, adjust the viscosity or properties of the synthetic resin layers, for example the mechanical properties or color. Examples of possible additives are organic solvents, water, coloring agents, such as dyes, pigments or color chips, fillers, fibers, hollow glass beads, emulsifiers, thixotropic agents, film-forming aids, leveling aids, deaeration aids and antisettling agents.

Commercial products for reactive resin systems for formation of the synthetic resin layers may include, for example, Sikafloor®-330, Sikafloor®-350 or Sikafloor®-264.

It is preferable that a synthetic resin layer is disposed immediately atop the primer. In a preferred embodiment, the floor covering is or comprises one or more synthetic resin layers. Polyurethane synthetic resin layers are preferred. The floor structure is therefore more preferably a synthetic resin floor, which may also be referred to as a reactive resin floor.

The floor covering may additionally or preferably alternatively comprise an adhesive bond or an adhesive layer. The adhesive layer can be formed using any conventional adhesive, especially liquid or pasty adhesive. It is preferable that the adhesive layer is disposed immediately atop the primer. The adhesive layer may consist of one adhesive layer or of two or more adhesive layers applied one on top of another. It has been found that, surprisingly, the primers of the invention can be detected by means of UV lamps through the adhesive bonds already applied thereto. This nondestructive mode of subsequent detection is quick and easy to conduct, of great benefit to the user, and employable with different types of adhesives.

The adhesive layer may be formed over the full area or part of the area. In the case of an adhesive layer over part of the area, only parts of the underlying overall surface, for example the primer, are covered. The application of adhesive layers over the full area or part of the area for bonding is very well known to the person skilled in the art.

In the case of application over the full area, the adhesive is applied over the entire area to be bonded. In the case of application of the adhesive layer over part of the area, the adhesive may be applied, for example, in the form of adhesive beads. The adhesive may be applied, for example, in elongated beads that are spaced apart from one another and arranged in parallel over the area to be bonded. The beads may be applied, for example, in longitudinal direction continuously or with interruptions. Application over part of the area can of course also be effected in a different pattern, for example the application of adhesive beads in a grid or diamond pattern. The person skilled in the art will be able to select the suitable form of application for the respective specific use directly by themselves or with reference to manufacturer's instructions.

Adhesives used may be customary adhesives for the bonding of two-dimensional materials. Typical adhesives are adhesive dispersions, polyurethane adhesives, epoxy resin adhesives and cementitious adhesives. Commercial products for suitable adhesives for formation of adhesive bonds or adhesive layers may include, by way of example, parquet adhesives, for example the Sikaflex® adhesives and SikaBond® adhesives for parquet floor coatings from Sika Deutschland GmbH.

The adhesive layer may especially serve to fix a two-dimensional material for the floor covering. In a preferred embodiment, the floor covering therefore comprises a bonded two-dimensional material, especially a two-dimensional material disposed or fixed on the primer by means of an intermediate adhesive layer applied over the full area or part of the area.

Examples of suitable two-dimensional materials are carpet, parquet, laminate, plastic webs or sheets, for example of PVC, polyolefin, rubber, linoleum or cork, preference being given to parquet. The floor covering comprising adhesive bonds is preferably a bonded parquet floor.

The floor covering preferably has a total layer thickness of at least 0.5 mm, more preferably at least 1.0 mm. The total layer thickness of the floor covering may vary within wide ranges according to the design.

If the floor covering comprises or is a floor coating, especially one or more synthetic resin layers, the total thickness of the floor covering may, for example, be in the range from 1 to 5 mm. If the floor covering comprises an adhesive bond or an adhesive layer, the adhesive in the case of application over the full area is applied, for example, in an amount of 200-1500 $g/mm^2$, in which case the density of the adhesive is preferably in the range of 1.0-1.3 kg/l. In the case of application over part of the area, for example in the form of adhesive beads, the amount applied is, for example, 500-1500 $g/mm^2$. The bead height is, for example, 2-15 mm.

In an optional embodiment, the floor structure may also have a seal atop the floor covering. Such seals are customary in industry. The seal may consist of one or more layers applied successively. For the sealing, it is possible to use coating compositions comprising reactive resins. Examples of suitable reactive resins are the same as already mentioned for the synthetic resin layers. One example of a commercial product for producing suitable seals is Sikafloor®-310, a two-component polyurethane coating composition.

The floor covering may optionally be sanded prior to application of the seal. The sealant, for example Sikafloor®-310, may be applied, for example, in an amount of 0.1 to 0.8 $g/m^2$. A seal may be appropriate especially in the case of floor coverings comprising synthetic resin layers. A seal may of course also be used in the case of a floor covering comprising a bonded two-dimensional material.

The invention also relates to a method of producing the floor structure of the invention on the base. The method comprises a) the priming of the base with the aforementioned primer and b) the applying of the floor covering comprising the floor coating and/or the adhesive bond to the primer, wherein the floor covering is optionally provided with a seal.

In a preferred embodiment, the applying of the floor covering comprises b1) the application of a reactive resin coating composition to the primer and curing to form a synthetic resin layer or b2) the application of an adhesive to the primer over the full area or part of the area and bonding of a two-dimensional material to the adhesive layer.

In a preferred embodiment, the method additionally comprises step c) of detecting the benzoxazole-based system in the primer, especially by means of ultraviolet radiation, especially with a UV lamp. It is possible here for step c) to precede step b).

However, step c) may also follow step c), especially more than 1 day, more than 1 week, especially more than 6 months, after step c). For example by sampling through a hole. The applicant has found that, in the case of sampling with a diameter of 5 cm through a floor structure of the invention, the primer can be detected easily and clearly by a fluorescent line. Since the primer of the invention features UV detectability for a long period, this is particularly preferred, especially in the case of subsequent quality control or investigations in the event of damage.

Step c) may further also follow the application of an adhesive over the full area or part of the area of a primer in step b2), especially 0-30 min thereafter. Since the primer of the invention can be detected through multiple types of adhesives by means of UV lamps, such a nondestructive manner of subsequent detection is quick and easy to conduct, of great benefit to the user.

The floor structure of the invention is suitable, for example, in private, public or commercial spaces, for example residences, hospitals, schools, workplaces, stores, offices, warehouses, garages, multistory car parks, underground garages, production and industrial halls, workshops, exhibition areas. The floor covering preferably is or comprises at least one synthetic resin layer or a two-dimensional material attached to an adhesive layer over the full area or part of the area. The floor structure is particularly suitable as a floor.

FIG. 1 shows a possible floor structure of the invention. FIG. 1 shows the structure merely in schematic form and is not true to scale. Additional layers are possible.

FIG. 1 shows a floor structure composed of a base 1, a primer 2 present above it (typically film-forming primer) or partly or entirely therein (typically deep primer), and a floor covering 3.

The floor covering 3 is preferably a floor coating 3, for example at least one synthetic resin layer. Particular preference is given to a synthetic resin floor having at least one synthetic resin layer. The floor coating 3 may contain one or more synthetic resin layers and a seal (optional), in that sequence.

As an alternative, the floor covering 3 is preferably a floor covering formed from an adhesive layer and a two-dimensional material. It is also possible for there to be two or more adhesive layers.

EXAMPLES

Floor structures were produced on a base consisting of a concrete slab. Primers used were the aqueous dispersions set out in tables 1 and 2, by means of a roller at an application rate of 200 g/m$^2$.

In the film-forming primer from table 1, a dry thickness of about 0.06 mm was found on the concrete slab.

In the deep primer from table 2, a penetration depth into the concrete slab of 2 mm was found.

1 day after application (visibility under UV light after 1 day) and after storage at 23° C. for 6 months in closed vessels (visibility under UV light after 6 months), the surface of the concrete slab was irradiated with a 200 mW UV light source at 365 nm. The visibility of the primer was assessed by the following scheme:

0: no fluorescence visible

+: very slight fluorescence visible

++: slight fluorescence visible

+++: strong fluorescence

++++: very strong fluorescence 1 day after production of the aqueous dispersions, the viscosity was measured with a Brookfield DV1 viscometer with spindle 4 at 20 rpm at 23° C. The viscosity is displayed in tables 1 and 2 as "Viscosity after 1 day". Thereafter, samples thereof were stored in a closed vessel at 23° C. for 4 weeks and measured again by the same method at 23° C. (viscosity after 4 weeks).

TABLE 1

| Raw materials | Ref. 1 | Ref. 2 | Ref. 3 | Ref. 4 | Ex. 1 | Ex. 2 |
|---|---|---|---|---|---|---|
| Styrene-acrylic ester copolymer dispersion, Acronal 5041, solids content 50%, particle size 100 nm (BASF) | 53.2 | 53.2 | 53.2 | 53.2 | 53.2 | 53.2 |
| Defoamer, Foamstar SI 2210 (BASF) | 0.4 | 0.4 | 0.4 | 0.4 | 0.4 | 0.4 |
| Thickener, Rheovis AS 1130 (BASF) | 1.5 | 1.5 | 1.5 | 1.5 | 1.5 | 1.5 |
| Styrylenebenzene derivative, Ruco Blank OBI (Rudolf GmbH) | | 0.1 | | | | |
| Stilbenedisulfonic acid derivative, Blankophor BA (Tanatex Chemicals B.V) | | | 0.1 | | | |
| Benzoxazinone derivative, Cartax DP fl (Clariant Plastics & Coatings GmbH) | | | | 0.1 | | |
| Benzoxazole-based system, 2,5-bis(benzoxazol-2-yl)thiophene, solids content 20%, Uvitex EBF 250% (Huntsman) | | | | | 0.1 | 0.01 |
| Water | 44.9 | 44.8 | 44.8 | 44.8 | 44.8 | 44.89 |
| Visibility under UV light after 1 day | 0 | + | ++ | ++ | ++++ | +++ |
| Visibility under UV light after 6 months | 0 | + | ++ | 0 | ++++ | +++ |
| Viscosity after 1 day | ~10 000 mPas | ~10 000 mPas | ~10 000 mPas | ~10 000 mPas | ~10 000 mPas | ~10 000 mPas |
| Viscosity after 4 weeks | ~10 000 mPas | >50 000 mPas | >50 000 mPas | ~10 000 mPas | ~10 000 mPas | ~10 000 mPas |

TABLE 2

| Raw materials | Ref. 5 | Ref. 6 | Ref. 7 | Ref. 8 | Ex. 3 | Ex. 4 |
|---|---|---|---|---|---|---|
| Styrene-acrylic ester copolymer dispersion, Acronal A508, solids content 41%, particle size 70 nm (BASF) | 54.7 | 54.7 | 54.7 | 54.7 | 54.7 | 54.7 |
| Defoamer, Foamstar SI 2210 (BASF) | 0.4 | 0.4 | 0.4 | 0.4 | 0.4 | 0.4 |
| Styrylenebenzene derivative, Ruco Blank OBI (Rudolf GmbH) | | 0.1 | | | | |
| Stilbenedisulfonic acid derivative, Blankophor BA (Tanatex Chemicals B.V) | | | 0.1 | | | |
| Benzoxazinone derivative, Cartax DP fl | | | | 0.1 | | |

TABLE 2-continued

| Raw materials | Ref. 5 | Ref. 6 | Ref. 7 | Ref. 8 | Ex. 3 | Ex. 4 |
|---|---|---|---|---|---|---|
| (Clariant Plastics & Coatings GmbH) Benzoxazole-based system, 2,5-bis(benzoxazol-2-yl)thiophene, solids content 20%, Uvitex EBF 250% (Huntsman) | | | | | 0.1 | 0.01 |
| Water | 44.9 | 44.8 | 44.8 | 44.8 | 44.8 | 44.89 |
| Visibility under UV light after 1 day | 0 | + | ++ | ++ | ++++ | +++ |
| Visibility under UV light after 6 months | 0 | + | ++ | 0 | ++++ | +++ |
| Viscosity after 1 day | <800 mPas | <800 mPas | <800 mPas | <800 mPas | <800 mPas | <800 mPas |

LIST OF REFERENCE NUMERALS 1 base
2 primer
3 floor covering or floor coating

The invention claimed is:

1. A floor structure on a base comprising a primer and a floor covering which is atop the primer and comprises a floor coating and/or an adhesive bond, characterized in that the primer is obtained from an aqueous dispersion of at least one acrylic polymer containing 0.001-0.2% by weight of at least one benzoxazole-based system, based on the total weight of the aqueous dispersion,
wherein
the aqueous dispersion has a viscosity one day after production of less than 3000 mPas, measured with a Brookfield DV1 viscometer with spindle 4 at 20 rpm at 23° C. and a particle size of 10-70 nm, and the primer has a penetration depth into the base of 1-10 mm, or
the aqueous dispersion has a viscosity one day after production of greater than 3000 mPas measured with a Brookfield DV1 viscometer with spindle 4 at 20 rpm at 23° C. and a particle size of 80-150 nm, and the primer has a dry layer thickness of 0.05-0.5 mm.

2. The floor structure as claimed in claim 1, wherein the floor covering as floor coating or adhesive bond comprises or is at least one layer formed by applying and curing a liquid or pasty material, where an adhesive layer can be applied as a layer over the full area or part of the area.

3. The floor structure as claimed in claim 1, wherein the floor coating or adhesive bond is disposed immediately atop the primer.

4. The floor structure as claimed in claim 1, wherein the floor covering as floor coating comprises or is at least one synthetic resin layer, or as adhesive bond comprises at least one adhesive layer applied over the full area or part of the area.

5. The floor structure as claimed in claim 1, wherein the floor covering as floor coating comprises one or more synthetic resin layers, where the floor covering is a synthetic resin floor, or
the floor covering as adhesive bond comprises at least one adhesive layer applied over the full area or part of the area and a two-dimensional material disposed atop the adhesive layer, where the floor covering is a bonded parquet floor.

6. The floor structure as claimed in claim 1, wherein the base is a base based on mineral binders.

7. The floor structure as claimed in claim 1, wherein the benzoxazole-based system is selected from the list consisting of 4,4'-(E)-bis(benzoxazolyl)stilbene, derivatives of 4,4'-(E)-bis(benzoxazolyl)stilbene, 2,5-bis(benzoxazol-2-yl)thiophene and derivatives of 2,5-bis(benzoxazol-2-yl)thiophene.

8. The floor structure as claimed in claim 1, wherein the at least one acrylic polymer is a copolymer of an acrylic monomer with one or more other ethylenically unsaturated monomers.

9. The floor structure as claimed in claim 1, wherein the at least one acrylic polymer has a glass transition temperature (Tg) in the range from −40 to 20° C.

10. The floor structure as claimed in claim 1, wherein the aqueous polymer dispersion has a viscosity one day after production of less than 3000 mPas, measured with a Brookfield DV1 viscometer with spindle 4 at 20 rpm at 23° C., and has a particle size of 10-70 nm, and has a penetration depth into the base of 1-10 mm.

11. The floor structure as claimed in claim 1, wherein the aqueous polymer dispersion has a viscosity one day after production of greater than 3000 mPas, measured with a Brookfield DV1 viscometer with spindle 4 at 20 rpm at 23° C., and has a particle size of 80-150 nm, and has a dry layer thickness of 0.05-0.5 mm.

12. A method of producing a floor structure on a base comprising a primer and a floor covering which is atop the primer and comprises a floor coating and/or an adhesive bond, wherein the primer is obtained from an aqueous dispersion of at least one acrylic polymer containing 0.001-0.2% by weight of at least one benzoxazole-based system, based on the total weight of the aqueous dispersion,
the method comprising
a) priming the base with the primer and
b) applying a floor covering comprising a floor coating and/or an adhesive bond to the primer,
wherein the floor covering is optionally provided with a seal, and
wherein
the aqueous dispersion has a viscosity one day after production of less than 3000 mPas, measured with a Brookfield DV1 viscometer with spindle 4 at 20 rpm at 23° C. and a particle size of 10-70 nm, and the primer has a penetration depth into the base of 1-10 mm, or
the aqueous dispersion has a viscosity one day after production of greater than 3000 mPas, measured with a Brookfield DV1 viscometer with spindle 4 at 20 rpm at 23° C. and a particle size of 80-150 nm, and the primer has a dry layer thickness of 0.05-0.5 mm.

13. The method as claimed in claim 12, wherein the applying of the floor covering comprises
b1) applying a reactive resin coating composition to the primer and curing to form a synthetic resin layer or
b2) applying an adhesive to the primer over the full area or part of the area and bonding a two-dimensional material to the adhesive layer over the full area or part of the area.

14. The method as claimed in claim 12, wherein the method additionally comprises step c) of detecting the benzoxazole-based system in the primer.

* * * * *